Patented Oct. 14, 1924.

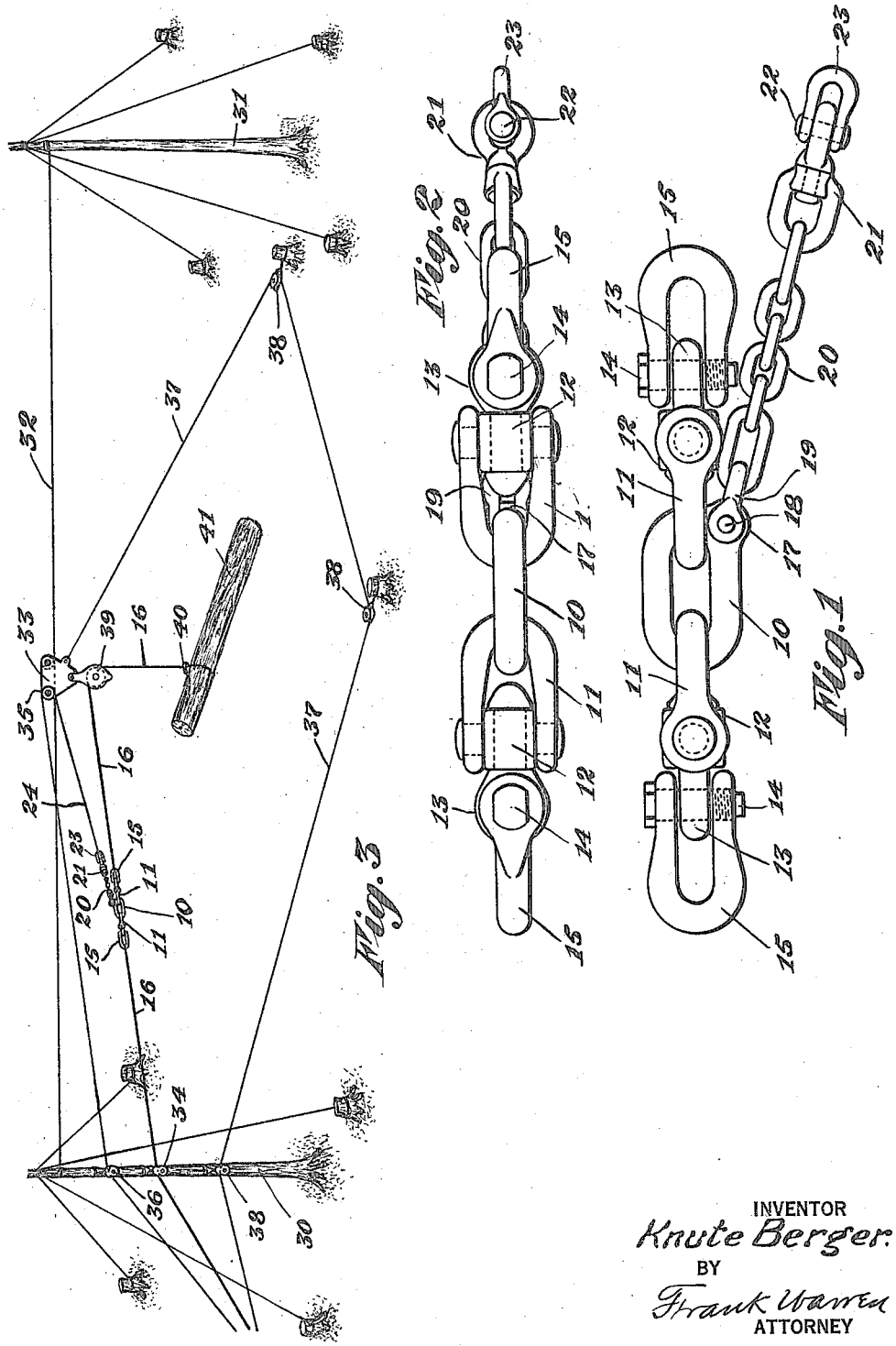

1,511,796

UNITED STATES PATENT OFFICE.

KNUTE BERGER, OF SEATTLE, WASHINGTON, ASSIGNOR TO WASHINGTON IRON WORKS, OF SEATTLE, WASHINGTON.

HAULING AND SLACK-PULLER LINE SWIVEL ATTACHMENT.

Application filed July 14, 1923. Serial No. 651,487.

*To all whom it may concern:*

Be it known that I, KNUTE BERGER, a citizen of the United States, residing at Seattle, in the county of King and State of Washington, have invented a certain new and useful Improvement in Hauling and Slack-Puller Line Swivel Attachments, of which the following is a specification.

My invention relates to improvements in hauling and slack puller line swivel attachments and more particularly to swivel attachments used in connection with interlocking skidder systems employed extensively in skyline logging operations and the object of my invention is to provide a swivel attachment designed to be interposed in the hauling line of the system at a predetermined point thereon and that is further designed to furnish a pivoted swivel connection therewith for the slack puller or load line of said system and having a flexible means attached thereto whereby twisting of the said lines during the logging operations is prevented, thus increasing the life of the lines which heretofore was relatively short due to the excessive wear when passing over the sheaves thereof.

Another object of my invention is to provide a swivel attachment designed to connect the hauling and slack pulled lines in such a manner that said lines will at all times and under all conditions pull at the proper angle to permit the swivels to function thereby preventing the twisting of the lines.

Another object is to provide a swivel attachment which will be of comparatively simple, inexpensive and durable construction and which will perform its functions in an efficient and practical manner.

I accomplish these objects by devices illustrated in accompanying drawings, wherein—

Figure 1 is a view in side elevation of a hauling and slack puller line swivel attachment constructed in accordance with my invention;

Fig. 2 is a view in top plan thereof; and

Fig. 3 is a view illustrating a skyline logging system having the swivel attachment interposed in the hauling line and connected to the slack puller line thereof.

Referring to the drawings throughout which like reference numerals indicate like parts, the numeral 10 designates a central link member having linked connection at each end with a shackle member 11 within the outer open ends of which are rotatively and transversely mounted cross-heads 12.

Journaled for rotation in the cross-heads 12 are longitudinally disposed swivel eye pins 13, to the eye portions of which are pivotally secured, as by pins 14, shackles or clevises 15 that are adapted to receive the ends of the hauling line 16 of the logging system disclosed in Fig. 3.

Integrally formed upon one end of the link member 10 adjacent the underside thereof is an eye 17 to which is pivotally secured, as by a pin 18, a clevis 19 having linked connection with the inner end of a relatively short chain 20 to the outer end of which is connected a swivel 21.

Pivotally secured to the swivel 21, as by a pin 22, is a clevis 23 that is adapted to receive the inner end of the slack puller line 24.

In Fig. 3 the numeral 30 designates the head spar tree and 31 the tail spar tree of a skyline logging system connected by a sky-line 32 upon which an aerial carriage 35 runs. The hauling line 16 extends upwardly from an engine drum, not shown, over a sheave 34 secured to the headspar tree 30 and extends outwardly therefrom to the inner shackle 15 of the swivel attachment to which it is secured, while the opposite end of said hauling line is similarly secured to the outer shackle 15 of said swivel attachment and extends outwardly therefrom to pass over a sheave 39 pivotally secured to the lower portion of the carriage 33 and thence downwardly therefrom and having upon the lower end thereof a chocker hook 40 that is adapted to secure a log 41 during the transportation thereof.

A haul back line 37 is secured to the carriage 33 and extends downwardly therefrom and over guide sheaves 38 suitably disposed to an engine drum, not shown. The slack puller line 24 is secured at the inner end thereof to the clevis 23 and extends outwardly therefrom through a sheave block 35 pivotally secured to the carriage 33 and thence returns over a sheave 36 secured to the head spar tree 30 to an engine drum, not shown.

It will be apparent from the foregoing description that any twisting action or torque occurring in either the hauling line 16 or slack puller line 24 will be immediately absorbed by my improved swivel attachment.

It will also be apparent that by providing a pivoted clevis 19, having a short chain 20 attached thereto, upon the hauling line swivel means will permit the slack puller line to untwist regardless of the angle it may assume during the logging operation for the reason that the swivel attached to the short chain may assume an operative position due to the pivoted clevis 19 and short chain 20 and in the event that it becomes necessary for the slack puller line to be drawn through the sheaves 35 or 39 the chain will prevent any cutting or wearing effect upon said line. The pivoted clevis 19 permitting the chain to fit snugly against the hauling line swivel means no matter in what direction it may pass over the sheaves.

While I have shown and described one embodiment of my invention, it is to be understood that I do not desire to be limited to the details of construction herein shown and described for obvious modifications will be apparent to those skilled in the art and I also desire it to be understood that certain features of my invention may be employed in other combinations than those herein described.

What I claim is:

A hauling and slack puller line swivel attachment embodying two swivel members interposed in the hauling line, an elongated link member connecting said two swivel members, a chain pivotally attached to said link member, and another swivel member attached to said chain.

In witness whereof, I hereunto subscribe my name this 6th day of July A. D. 1923.

KNUTE BERGER.